(12) United States Patent
Titz

(10) Patent No.: US 8,047,612 B2
(45) Date of Patent: Nov. 1, 2011

(54) ARMREST FOR A VEHICLE SEAT AND CORRESPONDING VEHICLE SEAT

(75) Inventor: Winfried Titz, Detmold (DE)

(73) Assignee: Isringhausen GmbH & Co. KG, Lemgo (DE)

( * ) Notice: Subject to any disclaimer, the term of this patent is extended or adjusted under 35 U.S.C. 154(b) by 628 days.

(21) Appl. No.: 11/993,741

(22) PCT Filed: Jun. 21, 2006

(86) PCT No.: PCT/EP2006/005976
§ 371 (c)(1),
(2), (4) Date: Dec. 21, 2007

(87) PCT Pub. No.: WO2006/136400
PCT Pub. Date: Dec. 28, 2006

(65) Prior Publication Data
US 2010/0194168 A1 Aug. 5, 2010

(30) Foreign Application Priority Data
Jun. 23, 2005 (DE) .......................... 10 2005 029 235

(51) Int. Cl.
*B60N 2/46* (2006.01)
*A47C 7/54* (2006.01)
(52) U.S. Cl. .......... 297/411.35; 297/411.36; 297/411.38
(58) Field of Classification Search ................... 297/115, 297/411.21, 411.35, 411.38, 411.39, 356; 297/411.36; 296/153; 248/118.1, 118.3
See application file for complete search history.

(56) References Cited

U.S. PATENT DOCUMENTS

| 4,073,538 | A |   | 2/1978  | Hunter |
|-----------|---|---|---------|--------|
| 4,621,864 | A | * | 11/1986 | Hill ................................ 297/115 |
| 4,763,860 | A | * | 8/1988  | Vauvelle et al. .......... 244/122 R |
| 5,590,934 | A | * | 1/1997  | Gibbs ....................... 297/411.38 |
| 5,823,624 | A | * | 10/1998 | Dahlbacka ............... 297/411.36 |
| 6,286,793 | B1 | * | 9/2001 | Hirose et al. .................. 248/118 |
| 6,341,821 | B1 |   | 1/2002 | Rousseau et al. |
| 2002/0190550 | A1 |   | 12/2002 | Huang |
| 2004/0090104 | A1 |   | 5/2004 | Seibold |

FOREIGN PATENT DOCUMENTS

| DE | 3110515    | 11/1982 |
| DE | 10235350   | 2/2004  |
| JP | 2005119506 | 5/2005  |
| JP | 2005247273 | 9/2005  |
| WO | 8603167    | 6/1986  |

* cited by examiner

*Primary Examiner* — David Dunn
*Assistant Examiner* — Tania Abraham
(74) *Attorney, Agent, or Firm* — Leydig, Voit & Mayer, Ltd.

(57) ABSTRACT

An armrest for a vehicle seat includes an armrest cushion, an armrest body connected to the armrest cushion, a connection part configured to connect the armrest body to at least one of a back rest of the vehicle seat or to a vehicle interior, a tilting device disposed between the armrest body and the armrest cushion and configured to adjust a position between the armrest body and the armrest cushion, and an arresting device disposed between the armrest body and the armrest cushion and configured to fix the position of the armrest cushion relative to the armrest body. A swivel axis is, formed in the connection part running substantially horizontal and parallel to the back rest. The tilting device has a rotation axis arranged parallel to the swivel axis and the rotation axis moveable towards the back rest linearly against a force of a spring.

9 Claims, 3 Drawing Sheets

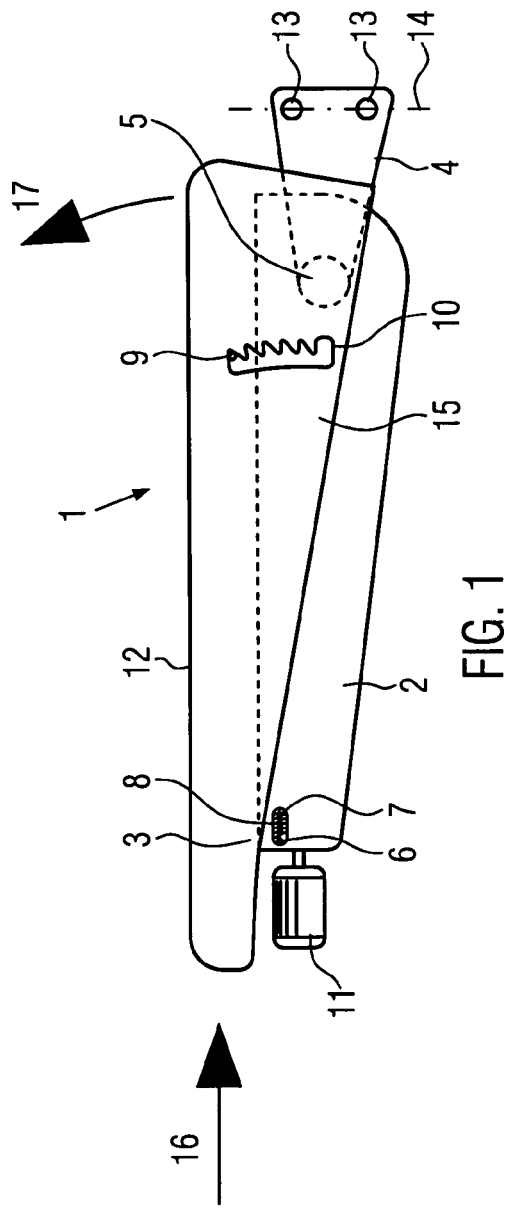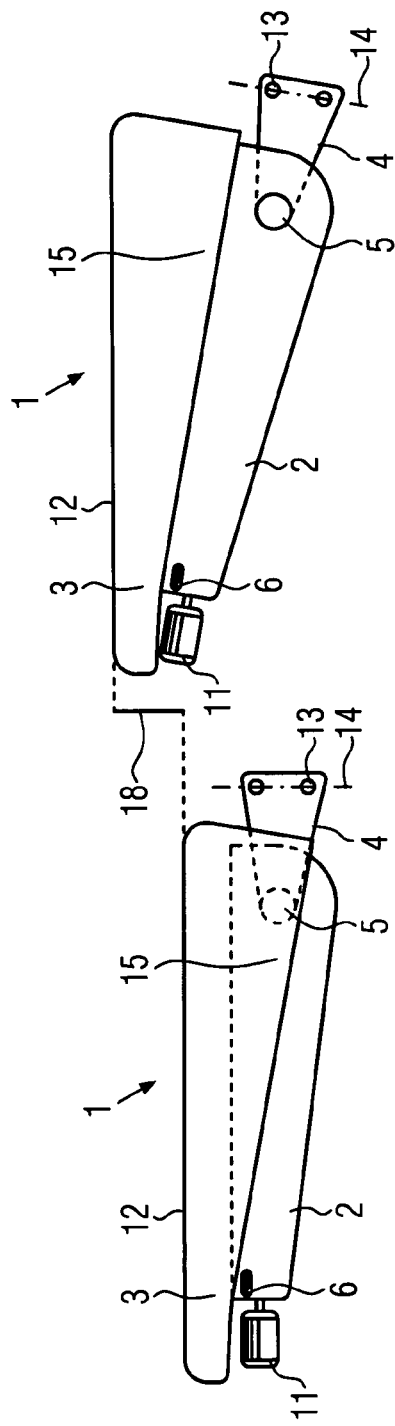

ARMREST FOR A VEHICLE SEAT AND CORRESPONDING VEHICLE SEAT

This is a U.S. National Phase application under 35 U.S.C. §371 of International Application No. PCT/EP2006/005976, filed Jun. 21, 2006 and claims the benefit of German Patent Application No. DE 10 2005 029235.6, filed on Jun. 23, 2005. The International Application was published in German on Dec. 28, 2006 as WO 2006/136400 under PCT Article 21 (2).

The invention relates to an armrest for a vehicle seat with an armrest body which is connected to an armrest cushion and can be connected to a back rest of the vehicle seat by means of a connection part. The invention also relates to a vehicle seat with a seat part which is connected to a back rest, wherein the back rest can be swiveled about a horizontal axis towards the seat part.

BACKGROUND

Today, vehicle seats generally have a back rest which can be swiveled about a horizontal axis vis-à-vis a seat part. Fittings of modern vehicles—in particular of utility vehicles—have armrests. One type of these armrests is fixedly attached to the back rest via a connection part. The initial angle of the armrest thereby changes when the angle at which the back rest is set is changed. To compensate for the angle the known armrests are housed rotatable about a point of attachment, which is formed as a swivel axis, near to the back rest. To make it easier to enter and leave, the known armrests are stop-limited in their folded-down use position and can be swiveled into a position parallel to the back rests. Thus, the angle of such cost-favourable embodiments can be adjusted, but their individual height cannot be adapted to the body size and the wishes of the driver. This problem has thus far been solved by means of suitable servoelements, such as long-hole bores and adjustment screws, through which the armrest attachment—i.e. in the area of the connection part between armrest and back rest—was adjustable. Changing the height with these means is however on the one hand very expensive and furthermore can be integrated into an appealing design only with difficulty. Another previous possible solution was to set the height of the armrest cushion through airbags or gas-filled foam cushions, in which a fill level and thus height, once preselected, is maintained by a check valve. However, such designs are at least as expensive as those above.

An armrest is known from U.S. Pat. No. 6,341,821 B1 which is movably attached to a guide rail aligned horizontally in the direction of travel. It can be fixed at any chosen point along this rail by a clamping joint. An armrest cushion is arranged above the guide rail and connected to the clamping joint via a connection part with an oblong hole. Both the height and the inclination of the armrest cushion can be changed vis-à-vis the guide rail via the oblong hole and fixed in the desired position by means of a clamping joint.

An armrest is known from U.S. Pat. No. 4,763,860 which is attached rotatable via an axis to a back rest of a vehicle seat. The angle between back rest and armrest basic body is set by means of a spindle. At the end of the armrest basic body remote from the back seat there is formed a rotation axis by means of which an armrest cushion can be tilted about a rotation axis formed parallel to the swivel axis. The angle between armrest cushion and armrest basic body can be set by a spindle.

An armrest for a vehicle is known from US 2002/190550 A1 which has an internal body which is fixedly connected to the vehicle seat and an armrest cushion which can be rotated about this internal body and can be locked in at least two different angle settings. Thereby it can be achieved that either one narrow edge of the armrest cushion or its broad edge points upwards. The rotation axis corresponds to the internal body aligned in the direction of travel.

An armrest is known from WO86/03167 which has a rail fixedly connected to a vehicle seat. An armrest cushion can be attached to this movable in longitudinal direction and fixable to it at any chosen point. In addition to the longitudinal movability of the armrest cushion the angle of the armrest cushion relative to the seat surface of the vehicle seat can also be changed with the help of a tipping mechanism.

By vehicle seats are meant in this application in particular seats for motor vehicles, utility vehicles, rail vehicles, aircraft and spacecraft.

SUMMARY OF THE INVENTION

An object of the invention is to provide an armrest or a vehicle seat with an armrest in which the relative position of the armrest cushion can be easily set both in respect of its height relative to the seat part of the vehicle seat and also its set inclination.

The armrest can be connectable to a back rest of the vehicle seat or to the interior of the vehicle. By an armrest body is meant a support which houses the technical elements of the armrest, such as fixing pins, adjustment elements for angle setting and the absorbing of operating loads as a static support. By an armrest cushion is meant a cushioned arm support which is attached to the top side of the armrest body and thus forms the interface between the technical element of the armrest body and the vehicle user. As the tilting device is located between the armrest body and the armrest cushion, the height of the armrest cushion can be set individually by the driver. The setting chosen by him, both the height and inclination angle of which can be adapted individually, can then be fixed by the arresting device present, with the result that there can be no unintended adjustment of this position chosen by the driver.

Because the connection part has a swivel axis running substantially horizontal and parallel to the back rest. The basic inclination of the armrest can thereby be set in an adjustable back rest.

The device has a rotation axis which is arranged parallel to the swivel axis. Thus the angle between the bottom edge of the armrest body and the top edge—i.e. the bearing surface—of the armrest cushion can be changed, whereby in particular upon a twisting of the entire armrest about the swivel axis or a complete tilting of the armrest when setting the angle of the back rest, the change in angle can be compensated. To actuate the tilting device there is used preferably a servoelement with associated self-arresting means, such as for example a spindle in combination with a spindle nut, a toothed lever in combination with a toothed segment or with a toothed rack, a clamping element or a friction element. Depending on the type of servoelement, this requires an actuation element, e.g. a handle or a knob. Because the rotation axis can be moved linearly towards the back rest against the force of a spring, very simple and cheaply designed arresting devices can be used to adjust the armrest. In addition, the armrest cushion thereby also becomes part of the setting kinematics and simultaneously actuation element. There is thus a saving on additional components thanks to this double function. A further actuation element is then no longer necessary.

A further advantageous development of the invention provides that the rotation axis is arranged at the end of the armrest body remote from the back rest. The rotation axis is thereby generally in the immediate proximity of an actuation element—such as for example a hand wheel or a key—by which the known functions of the armrest can be set. Moreover it is thereby possible, if the armrest body is initially at a steeper angle, to again achieve a bearing surface of the armrest cushion more aligned to the horizontal. A virtually constant distance between bearing surface of the armrest cushion and thus the hand rest and the actuation element is thereby achieved, which is ergonomically very favourable.

A further advantageous development of the invention provides that the rotation axis can be moved towards the back rest. In particular if the rotation axis can be moved linearly against the force of a spring, very simple and cheaply designed arresting devices can be used to adjust the armrest. In addition, the armrest cushion thereby also becomes part of the setting kinematics and simultaneously actuation element. There is thus a saving on additional components thanks to this double function. A further actuation element is then no longer necessary.

Advantageously the arresting device is structured such that it contains a notched bar which cooperates with a toothed segment. The result is a form-locking connection and thus a reliable arresting action which can, however, be easily released by a linear movement of the rotation axis against a spring force.

A further advantageous development of the invention provides that the armrest cushion has vertical edges which laterally at least partially cover the armrest body. A simple gap coverage between the bottom part of the armrest, the armrest body and the top part of the armrest, the armrest cushion, thereby takes place. This also applies when the height or the angle between armrest cushion and armrest body is adjusted. Thus there is a constant safeguarding against jamming or other injuries to the driver.

A further advantageous development of the invention provides that, in the area of the end near the connection part, a pressure spring is arranged between the armrest cushion and the armrest body. It is thereby possible that in the event of an upward adjustment no additional force need be applied by the user and in the event of a downward adjustment the pressure spring can be simply compressed by the body weight. Operating convenience is thus increased.

A further advantageous development of the invention provides that the armrest is fixedly connected to the interior of the vehicle. Thus it can be attached independently of the vehicle seat, but associated with it, as is frequently the case for example with armrests in cars in the area of the central console.

A vehicle seat according to the invention has an armrest according to the invention or a development of the invention. The armrest according to the invention is connected to the back rest via the connection part. Otherwise the vehicle seat is developed according to the state of the art and has a seat part which is connected to a back rest, wherein the back rest can be swiveled about a horizontal axis towards the seat part.

BRIEF DESCRIPTION OF THE DRAWINGS

Further advantageous developments of the invention are the subject of the claims. Advantageous versions of the invention are further described with the help of the embodiment examples represented in the Figures. There are shown in:

FIG. 1 a schematic side view of a first embodiment example of an armrest according to the invention, FIG. 2 an armrest according to FIG. 1 in two different positions at different inclinations of a back rest, FIG. 3 a side view of a second embodiment example of an armrest according to the invention in a first position and FIG. 4 the armrest from FIG. 3 in a second position.

DETAILED DESCRIPTION

Figure 3:
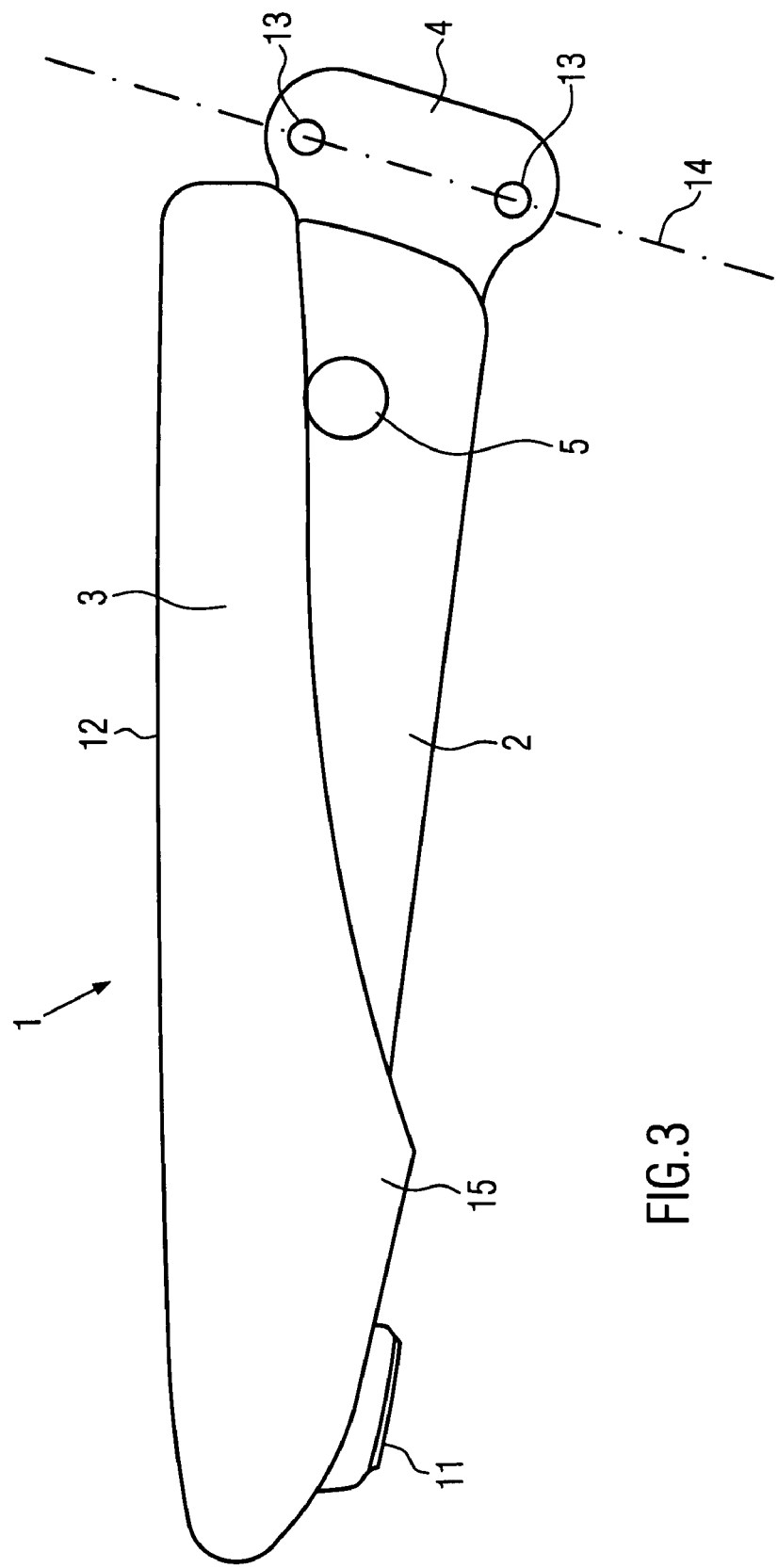

In FIG. 1 a first embodiment example of an armrest 1 according to the invention is represented in a side view. To illustrate the invention there are also represented parts which are not normally visible in a view of the armrest 1.

The armrest according to the invention 1 has parts known from the state of the art, such as for example an armrest body 2, which serves as a support of the technical elements and is developed U-shaped in its cross-section with an upwards opening. Such a known armrest body 2 is connected to a connection part 4 via a swivel axis 5, with the result that the whole armrest 1 can be moved about the horizontally-running swivel axis 5 vis-à-vis a back rest (not shown). The armrest 1 is fixedly connected to the back rest via the connection part 4 by means of the fixing holes 13 via fixing elements (not shown), such as for example screws. For reasons of simplicity it has been assumed that the back rest is connected to the connection part 4 such that the back-rest plane 14 runs perpendicular to the plane of the page through the fixing holes 13. It is however equally possible that the back-rest plane 14 is arranged at another angle or at another position, i.e. further to the left or right in the representation.

Attached to the end of the armrest body remote from the back rest 2 is a servoelement 11, by means of which the inclination of the armrest body 2 vis-à-vis the connection part 4 and thus the back-rest plane 14 can be changed, by a rotation taking place about the swivel axis 5. Such a servoelement 11 is well known from the state of the art and ensures that the armrest body 2 is brought into the desired position and is arrested there. For example in this case it can be an actuation element such as a spindle in conjunction with a spindle nut, a toothed lever in conjunction with a toothed segment or with a toothed rack, a clamping element or a friction element and also a one-way locking mechanism (such as for example with a fitting for a reclining seat).

The armrest body 2, open to the top, is covered by an armrest cushion 3. Unlike in the state of the art, where this armrest cushion 3 is fixedly attached to the armrest body 2, these two components are formed swivellable relative to each other. To this end two opposite oblong holes 8 are developed in the sides of the armrest body 2. A rotation axis 6 arranged in these oblong holes 8 is fixedly attached to the armrest cushion 3. This rotation axis 6 can rotate within the oblong hole 8 and be moved linearly towards the back rest (or away from it) against a spring force. To this end a spring 7 is arranged between the rotation axis 6 of the armrest cushion 3 and a stop which is located in the area of the end of the oblong hole 8 near to the back rest. Thus the spring 7 presses the rotation axis 6 against the end of the oblong hole 8 remote from the back rest.

In order that the armrest cushion 3 can be arrested in different angle positions relative to the armrest body 2, an arresting device is provided between armrest body 2 and armrest cushion 3. This is developed in the represented embodiment example as a detent pin 9 fixedly connected to the armrest body 2 in conjunction with a toothed segment 10 fixedly connected to the armrest cushion 3. As long as no counterforce is acting on the spring 7, the toothed segment 10 of the armrest cushion 3 is pressed from the right against the detent pin 9 of the armrest body 2. This then engages in one of the rest positions. In order to release the arrested armrest cushion 3 is pressed along the direction of pressure 16. The toothed segment 10 thereby moves to the right with the whole armrest cushion 3 and the detent pin 9 at the armrest body 2 moves out of its engaged position until it is located in the vertically running part of the toothed segment 10.

If a downward adjustment is desired, nothing else need be done, as the armrest cushion 3 moves downwards due to gravity and in the process performs a rotation about the rotation axis 6. Once the armrest support 12 is located in the desired plane, the pressure along the direction of pressure 16 is absorbed by the armrest cushion 3 and the detent pin 9 engages again in a toothed segment 10, with the result that a secure arrest in the new desired angular position between armrest cushion 3 and armrest body 2 is guaranteed.

When the armrest cushion 3 is adjusted upwards, during the pressure in the direction of pressure 16 the armrest cushion 3 must be simultaneously drawn upwards in the direction of pull 17. A pressure spring (not represented) between armrest body 2 and armrest cushion 3 in the end near the connection part can support this upward movement. When such a pressure spring is used, in the case of an upward adjustment movement described above a pressure needs merely to be exerted by means of the body weight on the armrest cushion 3. Once the desired position of the armrest support 12 is reached the pressure in the direction of pressure 16 is removed, with the result that the detent pin 9 engages again in form-locking manner in the toothed segment 10 and thus an arrest has taken place again.

Thus the armrest cushion 3 very simply becomes part both of the setting kinematics and simultaneously the actuation element.

In FIG. 2 two positions of the armrest 1 represented in FIG. 1 are reproduced. With the help of the representation in this figure the process can be well understood, by which the plane of the armrest support 12 can also be maintained, and simultaneously the height of the armrest support 12 set, in the case of a tilting of the back-rest plane 14.

In the left-hand part of FIG. 2 the back-rest plane 14 is arranged vertical and the armrest cushion 3 in a down position. This corresponds substantially to the representation in FIG. 1. In this position the armrest support 12 is in a horizontal plane. If the back-rest plane 14 is moved to the right out of its vertical position, the armrest body 2 swivels (as long as it is not rotated about the swivel axis 5) fixedly with the back-rest plane 14, as there is a fixed connection to the back rest via the connection part 4. The armrest body 2 thus stands upright. This means that in the intermediate position, not represented, the armrest support 12 no longer lies in the horizontal plane but is inclined from top-left to bottom-right.

However, if the driver desires a horizontal armrest support 12, this can be achieved very simply also in the new, inclined back-rest plane 14 without the swivel axis 5 of the whole armrest 1 needing to swivel. To this end there is simply—as already described above in connection with FIG. 1—a pressure in the direction of pressure 16 (see FIG. 1) onto the armrest cushion 3 and the armrest cushion 3 is pulled upwards along the direction of pull 17 in the area near the back rest and in the position the pressure along the direction of pressure 16 is absorbed by the armrest cushion 3, in which there is again a horizontal alignment of the armrest support 12. It goes without saying that also in any other position an arrest of the armrest cushion 3 is possible. The final position, represented on the right in FIG. 2, of the armrest 1 is thereby obtained. The height-adjustment area 18 between the respective positions of the armrest support 12 can be seen clearly.

The advantage with this setting procedure vis-à-vis the procedure known from the state of the art is that according to the state of the art (i.e. with a fixed connection between armrest cushion 3 and armrest body 2), a horizontal alignment of the armrest support 12 would again actually also be possible, but only via a rotation about the swivel axis 5. According to the invention however a change in the height setting of the armrest support 12 via the seat part (not represented) of the vehicle seat is also possible.

Figure 4:
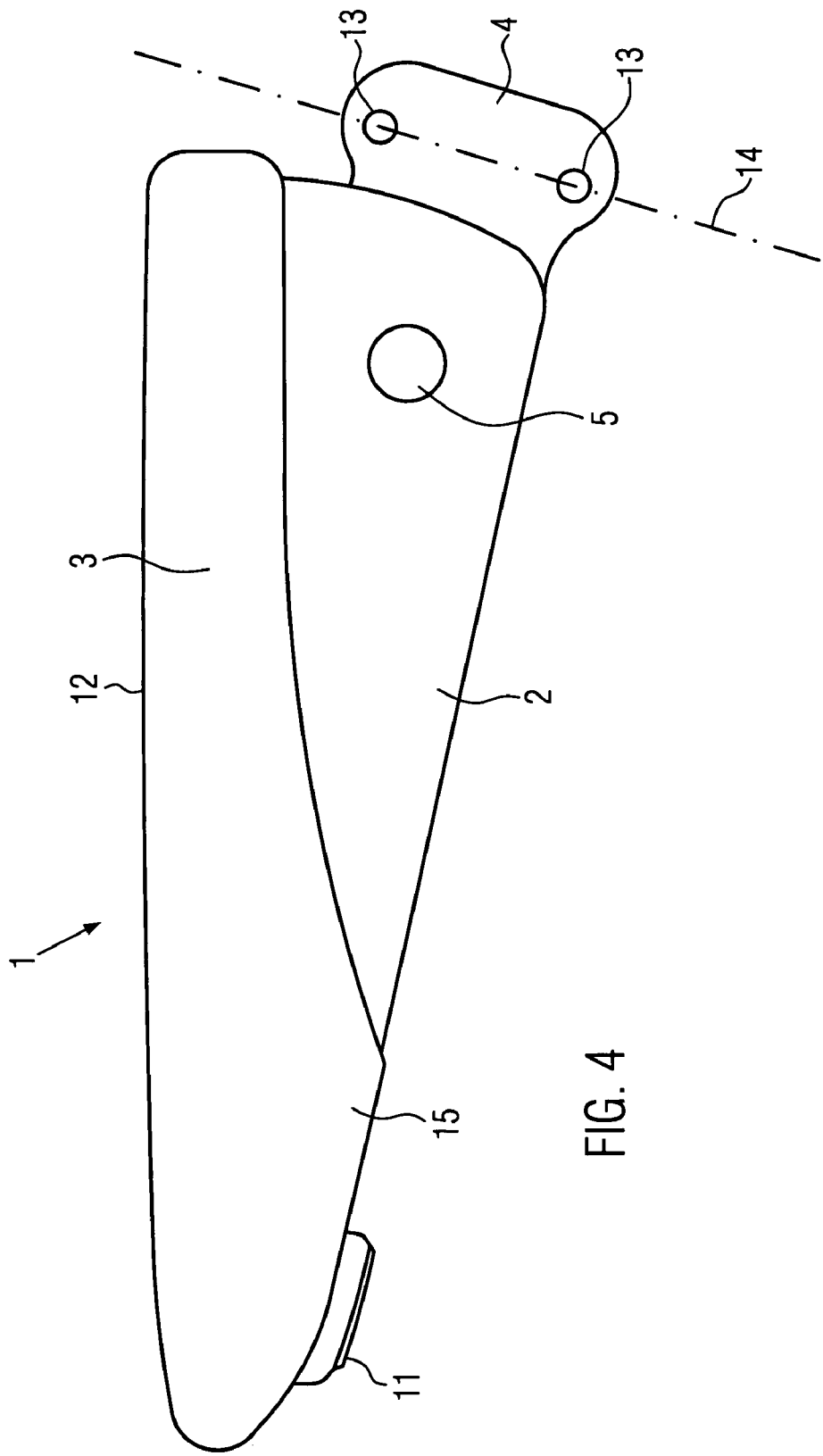

A second embodiment example of an armrest according to the invention is represented in FIGS. 3 and 4, wherein a height adjustment of the armrest support 12 has taken place between these two Figures without tilting the back rest 14. Identical parts or those having identical effects are given the same numbers in this embodiment example as in the first embodiment example of FIGS. 1 and 2.

The main difference between the two embodiment examples is that the respective armrest cushion 3 has differently fitted side edges 15 in its side area. The side edges 15 thus serve in the second embodiment example of FIGS. 3 and 4 and in the first embodiment example of FIGS. 1 and 2 to ensure that there is no gap between armrest body 2 and armrest cushion 3—whatever the angular position between these two parts—and thus a risk of injury to the driver is avoided.

There follows a description of the steps taken to adjust the height of the armrest support 12, starting from FIG. 3 and ending in FIG. 4. Firstly the angle setting between the armrest body 2 and the connection part 4 is changed. It can be clearly seen from the two Figures that there has been an upward adjustment of the angle from FIG. 3 to FIG. 4, i.e. to a higher point at the end of the armrest body remote from the back rest 1. In order to achieve the adjustment of the armrest body 2 to this steeper position, a rotation about the swivel axis 5 is undertaken. To this end, in the embodiment example represented the servoelement 11 is located at the end of the armrest body remote from the back rest 1. The rotation is carried out by rotating the latter, which for example is formed as a spindle in conjunction with a spindle nut or another version well known from the state of the art. As the whole armrest 1 merely swivels about the swivel axis 5, an intermediate position (not shown) is adopted in which the armrest support 12 is no longer horizontal, as represented in FIG. 3, but likewise falls from top-left to bottom-right. In order to again achieve a horizontal alignment of the armrest support 12, the angular position between the armrest body 2 and the armrest cushion 3 is changed—as already described above with regard to FIGS. 1 and 2. To avoid repetition, reference is made to the above versions which result from a pushing of the armrest cushion 3 in the direction of pressure 16 and pulling in the direction of pull 17 (see FIG. 1). Both the movement of the armrest cushion 3 and also its arrest take place exactly as described above.

As a result, when the alignment of the armrest support 12 is again horizontal, the end-position represented in FIG. 4 is obtained. It can be clearly seen that the side edge 15 of the armrest cushion 3 has again moved upwards (in particular in the area near the back rest), thus exposing a larger part of the side of the armrest body 2. However, the side edge 15 is formed such that it still extends so far down laterally that there is no slit between armrest cushion 3 and armrest body 2 and thus no risk of injury for the driver.

The invention claimed is:
1. An armrest for a vehicle seat, the armrest comprising:
an armrest cushion;
an armrest body connected to the armrest cushion;
a connection part configured to connect the armrest body to at least one of a back rest of the vehicle seat or to a vehicle interior, the armrest body being rotatable with respect to the connection part about a swivel axis that is substantially horizontal and parallel to the back rest;

a tilting device disposed between the armrest body and the armrest cushion and configured to adjust an angle position between the armrest body and the armrest cushion; and an arresting device disposed between the armrest body and the armrest cushion and configured to fix the position of the armrest cushion in different discrete angle positions relative to the armrest body;

wherein the tilting device has a rotation axis arranged parallel to the swivel axis, the rotation axis being moveable towards the back rest linearly against a force of a spring and in a longitudinal direction of the armrest body, wherein the rotation axis of the tilting device is held by the spring in a first position that corresponds to the arresting device being engaged, and wherein a release of the arresting device corresponds to movement of the rotation axis of the tilting device against the force of the spring.

2. The armrest as recited in claim 1, further comprising a servoelement configured to rotate the armrest body about the swivel axis.

3. The armrest as recited in claim 2, wherein the servoelement includes at least one of a spindle in conjunction with a spindle nut, a toothed lever in conjunction with a toothed segment with a toothed rack, a clamping element and a friction element.

4. The armrest as recited in claim 1, wherein the rotation axis is disposed at an end of the armrest body opposite the swivel axis.

5. The armrest as recited in claim 1, wherein the arresting device contains a notched bar cooperating with a toothed segment.

6. The armrest as recited in claim 1, wherein the armrest cushion includes vertical edges that laterally at least partially cover the armrest body in all of the different angle positions of the armrest cushion relative to the armrest body that are fixable by the arresting device.

7. The armrest as recited in claim 1, further comprising a pressure spring disposed at an area of an end of the armrest near the connection part, between the armrest cushion and the armrest body the pressure spring being configured.

8. The armrest as recited in claim 1, wherein the armrest is fixedly connected to the vehicle interior.

9. A vehicle seat comprising:

a back rest;

a seat part connected to the back rest, wherein the back rest can be swiveled about a horizontal axis towards the seat part;

an armrest cushion;

an armrest body connected to the armrest cushion;

a connection part configured to connect the armrest body to the back rest, the armrest body being rotatable with respect to the connection part about a swivel axis that is substantially horizontal;

a tilting device disposed between the armrest body and the armrest cushion and configured to adjust a relative angle position between the armrest body and the armrest cushion; and an arresting device disposed between the armrest body and the armrest cushion and configured to fix the position of the armrest cushion in different angle positions relative to the armrest body in discrete steps;

wherein the tilting device has a rotation axis arranged parallel to the swivel axis, the rotation axis being linearly moveable towards the swivel axis against a force of a spring, wherein the rotation axis of the tilting device is held by the spring in a first position that corresponds to the arresting device being engaged, and wherein a release of the arresting device corresponds to movement of the rotation axis of the tilting device against the force of the spring.

* * * * *